Patented Sept. 27, 1949

2,483,026

UNITED STATES PATENT OFFICE 2,483,026

VULCANIZATION OF RUBBER

Samuel van der Meer, Delft, Netherlands, assignor to Rubber-Stichting, Delft, Netherlands No Drawing. Application October 8, 1946, Serial No. 702,017. In the Netherlands July 4, 1941

1 Claim. (Cl. 260—768)

The invention relates to the vulcanization of rubber.

It is an object of the invention to provide a new vulcanizing agent for rubber and another object is to produce rubber vulcanization products with new characteristics.

A special object is to produce vulcanized rubber with excellent swelling properties, i. e. rubber which hardly swells in the usual rubber solvents, such as benzene, petrol, etc. It is also an object of the invention to produce vulcanized rubber, which can be successfully united to metals, without producing a corrosive action on the metals.

The term rubber whenever used in the following specification and claim, comprises not only natural rubber, but also guttapercha, balata, gondang etc. and also synthetic rubber or mixtures of two or more of the said materials. Reclaimed rubber cannot be vulcanized with the vulcanizing agents according to the invention, as no good vulcanizates can be obtained therewith, but it can be used as an addition to the above mentioned substances.

The term vulcanizing whenever used according to the present invention comprises the conversion of compounded rubber from a preponderately plastic into a preponderately not-plastic, elastic condition. If compounded rubber is used containing sufficient of the vulcanizing agent to convert the rubber by heating into hard rubber or ebonite, an elastic, non-plastic condition sets in after some time of heating. By continued heating the rubber passes the elastic stage and is converted into ebonite, a hard insoluble mass, with excellent insulating properties.

According to the invention rubber is vulcanized by a reaction with bis(bromethyl)-2,6-methyl-4-phenol in a single or a two stage process. If the reaction is a two-stage process an intermediate product is formed in the first stage, a product, which may be called a "prevulcanizate" which can be converted into the final vulcanized product by further heating.

A prevulcanizate does not possess the same solubility in rubber solvents as the raw rubber. The product is softer than an unvulcanized rubber and it is not elastic.

The vulcanizate obtained according to the invention possesses better mechanical and chemical properties than ordinary vulcanized rubber. Such vulcanization product shows a better resistance to abrasion, and higher heat resistance, better electric properties, better resistance against chemicals and a decreased solubility and swelling in solvents and swelling agents.

The vulcanization according to the invention is preferably performed in the complete absence of sulphur. If sulphur is present the amount thereof should be so low as to be insufficient to bring about a satisfactory vulcanization, as the sulphur vulcanization is a much more rapid reaction than vulcanization according to the invention.

The following specific example represents a practical operating embodiment of my invention and illustrates how my process can be operated in practice.

100 parts of rubber are mixed with 10 parts of bis(bromomethyl)-2,6-methyl-4-phenol and the mixture is then vulcanized for 30 minutes at 125° C. The examination of the vulcanizate as measured by using dumb-bell test specimens of 1 mm. gauge shows the following results:

a. Tensile strength, kg./cm.$^2$ _____ 90
b. Elongation at break, per cent _____ 695
c. Modulus: At 100% elongation, kg./cm.$^2$ ___ 3
   At 200% elongation _____ 6
   At 400% elongation _____ 16
d. Hardness Shore A _____ 30
e. Permanent set after 24 h. 200% elongation:
   After 1 h. per cent _____ 10
   After 24 h. per cent _____ 5

Various changes in the reaction conditions and reaction components, as employed in the specific example, may be made, as will be understood by those skilled in the art, without departing from the spirit or the scope of the subjoined claim.

I claim:

The process of vulcanizing rubber which comprises heating rubber in admixture with a small but effective amount of bis(bromethyl)-2,6-methyl-4-phenol.

SAMUEL VAN DER MEER.

REFERENCES CITED

The following references are of record in the file of this patent:

UNITED STATES PATENTS

| Number | Name | Date |
|---|---|---|
| 2,211,048 | Bitterisch | Aug. 13, 1940 |

FOREIGN PATENTS

| Number | Country | Date |
|---|---|---|
| 475,034 | Great Britain | Nov. 8, 1937 |

OTHER REFERENCES

Wildschut A. P. C. 357,662, Apr. 20, 1943.
"Rubber Chemistry and Technology," vol. 18 of 1945, pp. 853–873.